United States Patent [19]

Dame

[11] 4,106,484

[45] Aug. 15, 1978

[54] ADJUSTABLE SOLAR CONCENTRATOR

[75] Inventor: Richard E. Dame, Silver Spring, Md.

[73] Assignee: Mega Analytical Research Services, Inc., Silver Spring, Md.

[21] Appl. No.: 783,345

[22] Filed: Mar. 31, 1977

[51] Int. Cl.$^2$ .............................................. F24J 3/02
[52] U.S. Cl. .................................... 126/271; 350/295
[58] Field of Search ................ 350/295; 126/270, 271

[56] References Cited

U.S. PATENT DOCUMENTS

| | | | |
|---|---|---|---|
| 1,683,266 | 9/1928 | Shipman | 126/271 |
| 1,951,404 | 3/1934 | Goddard | 126/270 |
| 2,133,649 | 10/1938 | Abbot | 126/271 |
| 3,915,147 | 10/1975 | Rineer | 126/271 |
| 3,959,056 | 5/1976 | Caplan | 126/271 |
| 4,038,971 | 8/1977 | Bezborodko | 126/270 |

*Primary Examiner*—Carroll B. Dority, Jr.
*Attorney, Agent, or Firm*—John N. Randolph

[57] ABSTRACT

A solar concentrator is provided having means allowing for deformation and precise adjustment of a cylindrical parabolic solar energy reflecting surface of the concentrator. The aforesaid means produces a geometrically correct concentrator surface which can be adjusted after fabrication to provide a sharp solar image on the receiver tube.

7 Claims, 7 Drawing Figures

ADJUSTABLE SOLAR CONCENTRATOR

BACKGROUND OF THE INVENTION

Large cylindrical parabolic solar energy concentrators, as presently produced, require precise fabrication to provide a surface free of focusing errors. This precise fabrication requires expensive tooling, forms and fixtures or molds to form the concentrator surface.

SUMMARY

It is a primary object of the present invention to eliminate this need for costly fabrication and to provide an inexpensively produced solar concentrator having a geometrically accurate concentrator surface, capable of being adjusted after fabrication to produce a sharp solar image on the receiver tube.

Another object of the invention is to provide a solar energy concentrator having a movable focal point.

Still a further object of the invention is to provide a solar concentrator which may be very economically manufactured, and which may be readily and accurately adjusted at any time during the useful life of the concentrator to correct any inaccuracy in the cylindrical parabolic reflecting surface to restore a sharp solar image on the receiver tube.

Various other objects and advantages of the invention will hereinafter become more fully apparent from the following description of the drawings, illustrating presently preferred embodiments thereof, and wherein:

DESCRIPTION OF THE PREFERRED EMBODIMENTS

Figure 1:
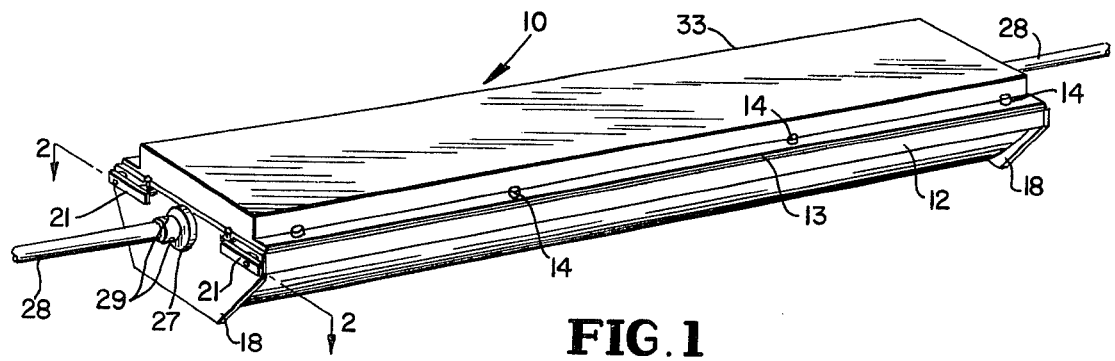
FIG. 1 is a perspective view of the solar concentrator.
Figure 2:
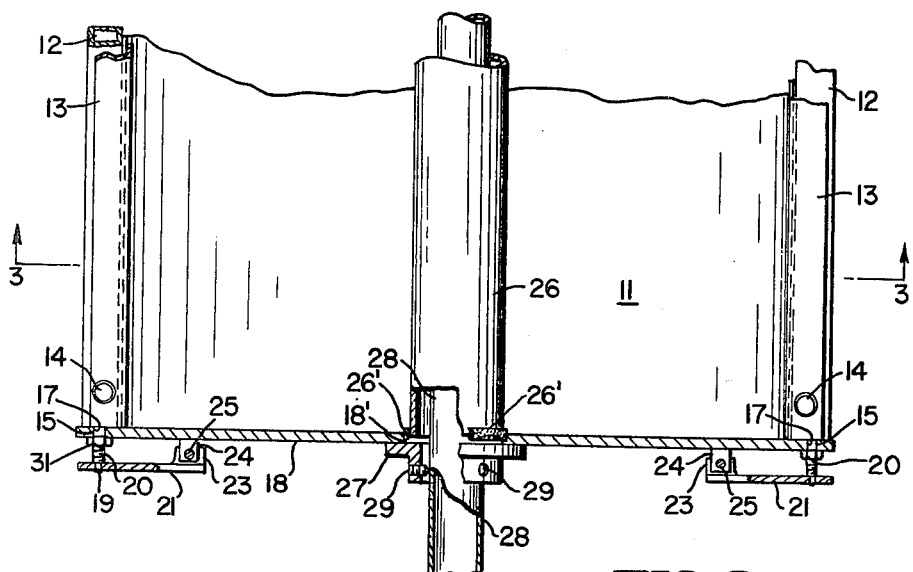
FIG. 2 is an enlarged fragmentary horizontal sectional view, taken substantially along the line 2—2 of FIG. 1.

Referring more specifically to FIGS. 1, 2, 3, 6 and 7 of the drawings, the adjustable solar concentrator as illustrated in these views is designated generally 10 and includes an elongaged concentrator plate 11 which may be formed of polished metal, mirrored plastic or other suitable reflecting material capable of flexing. The longitudinal side edges of the plate 11 are shown secured against adjacent parallel sides of rectangular parallel tubes 12. Said side edges are shown secured to the tubes 12 by clamp members 13 of angular cross section having top flanges which are secured to top surfaces of the tubes 12 by nut and bolt fastenings 14, and inner depending flanges between which and said tubes the side edges of the plate 11 are clamped.

Figure 6:
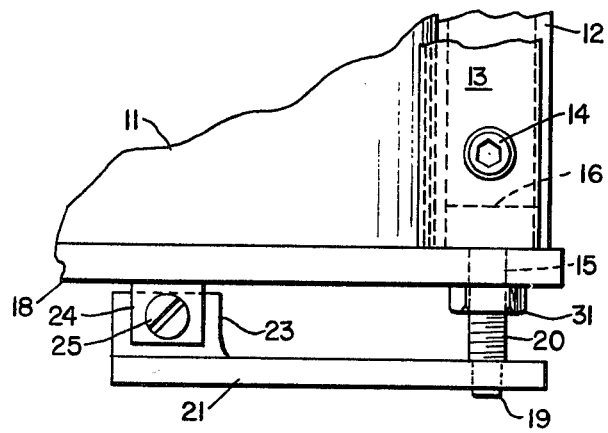
FIG. 6 is an enlarged fragmentary top plan view of one corner of the concentrator of FIGS. 1 to 3.

Trunnions 15 are secured to and project from the closed ends 16, FIG. 6, of the tubes 12. The trunnions of each tube are disposed in alignment with one another and extend through openings 17 in end walls 18 of the concentrator, for supporting the tubes 12 between said end walls. Said tubes in turn support the plate 11 which is disposed between but not connected to the walls 18. Trunnions 15 have unthreaded portions disposed in the openings 17, square outer ends 19, and threaded intermediate portions 20, which are disposed between the ends 19 and walls 18.

Figure 7:
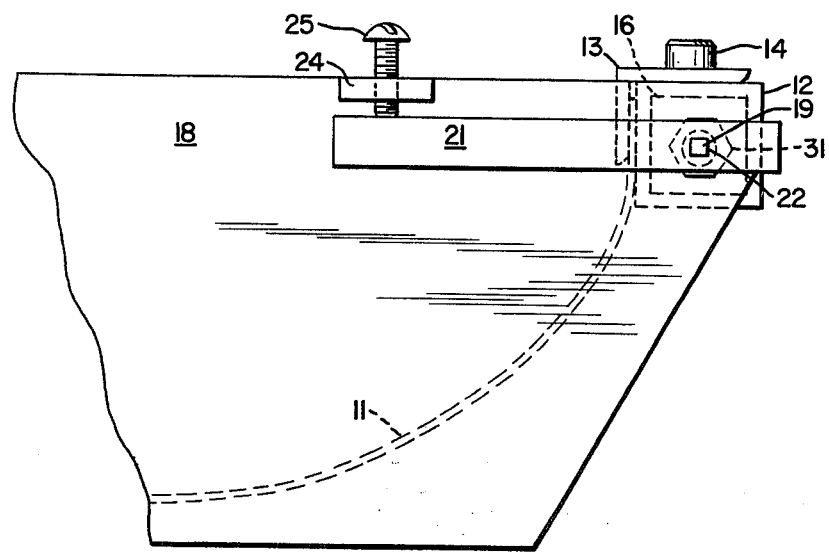
FIG. 7 is an enlarged view in end elevation thereof.

As best seen in FIGS. 6 and 7, moment arm bars or levers 21 have non-circular openings 22, adjacent corresponding ends thereof, which fit non-turnably on the square ends of wrench flats 19. Arms 21 extend inwardly from the trunnions 15 and have inner end portions 23 which are disposed beneath pads or flanges 24 which extend outwardly from the end walls 18. Adjusting screws 25 are threaded downwardly through pads 24 into abutting engagement with upper surfaces of the arm portions 23. Varying moments as indicated by the arrows M are applied to the tubes 12, be means of forces applied through rotation of the screws 25, for flexing the reflector plate 11.

A transparent tube 26, constituting a thermal shield, extends partially through the end walls 18 and is supported in aligned openings 18' thereof by rubber bushings 26'. Flanged collars 27 are secured to the outer sides of end walls 18 with their axis co-aligned with the axis of openings 18'. A receiver tube 28 extends through the tube 26 and the collars 27 and is supported concentrically therein and spaced therefrom by sets of screws 29 which threadedly engage collars 27, each of which sets consists of at least three screws, as seen in FIG. 1. A transparent cover 33 is detachably mounted on the walls 18 and clamps 13 to enclose plate 11.

From the foregoing, it will be apparent that moments of force can be applied to the four arms 21 by adjustment of the screws 25, for imparting such moments, as indicated by the arrows M, to the tubes 12 and in turn to the reflector plate 11, for producing a geometrically correct cylindrical parabolic solar energy reflecting surface which will produce a sharp solar image on the receiver tube 6. Accordingly, the sun's energy as indicated by the arrow tipped broken lines 30 impinges on the reflecting surface 11 and is directed toward the axis g of the receiver tube 28. Tube 28 is heated by this concentration of thermal energy flux to in turn heat fluid passing through said tube 28.

After adjustment of the reflector plate 11, as heretofore described, the moments M applied to the tubes 12, can be held by advancing lock nuts 31, which engage the threaded portions 20 of the trunnions 15, against the end plates 18.

Figure 3:
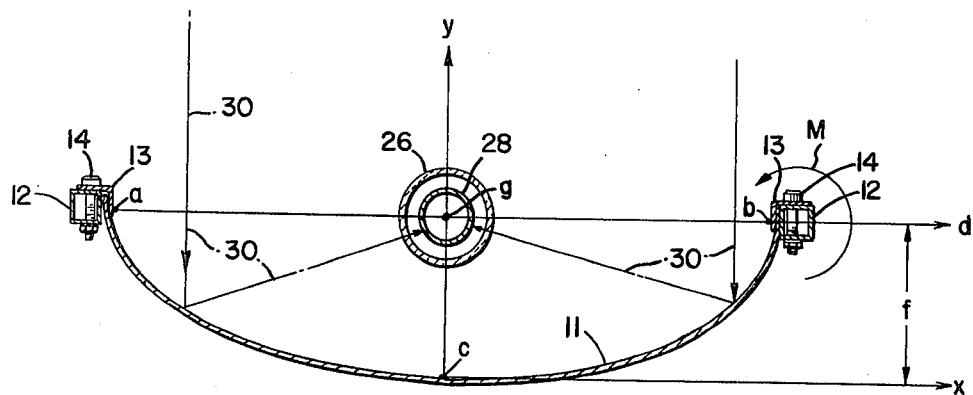
FIG. 3 is a cross sectional view, taken substantially along a plane as indicated by the line 3—3 of FIG. 2.
Figure 4:
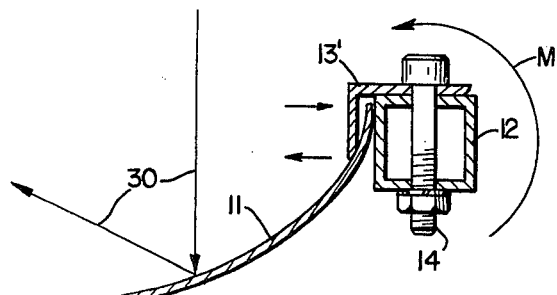
FIG. 4 is an enlarged fragmentary sectional view similar to a part of FIG. 3 but illustrating a slight modification.

FIG. 4 illustrates a slight modification of the structure seen in FIG. 3, and wherein the top flange of the angle plate 13' is made wider so that the depending flange is spaced from the tube 12. As a result, a side edge of the plate 11 fits loosely between said depending flange and the tube 12.

Figure 5:
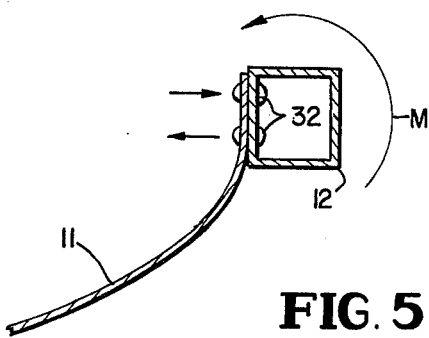
FIG. 5 is a view similar to FIG. 4 illustrating a second modification.

FIG. 5 illustrates another modification wherein the member 13 and fastenings 14 are omitted and a side edge of the reflector plate 11 is secured, as by rivets 32, to the inner side of the tube 12. Likewise, the side edges of the plate 11 could be secured by a suitable adhesive bond to the adjacent inner sides of the tubes 12.

Referring to FIG. 3, the theoretical justification for the present invention performance can be observed. The shape of a parabolic concentrator 10 is given by the relation:

$$Y = X^2/4f$$

where $X$ is the horizontal coordinate measured along an axis passing through point $c$ and parallel to a line $d$ passing through points $a$ and $b$. The $Y$ coordinate is measured along a line parallel to a line passing through the points $c$ and $g$, and is measured at a corresponding point along the $X$ axis, and $f$ is the focal distance measured between points $c$ and $g$. This equation is simiar to the equation of deflection for a thin plate which has moments applied to opposite edges along the full length of that side. The plate deflects into a cylindrical parabolic shape which is given by the relation:

$$Y = X^2/2EI/M$$

where $X$ and $Y$ are coordinates measured as before in FIG. 3, $E$ is the Young's modulus of the material, $I$ is the moment of inertia per unit length of the plate and $M$ is the applied moment along the edges of the plate at opposite sides. The desired parabolic shape can be formed by selecting the proper applied moment M such that the combination 2EI/M is equal in magnitude to the value of $4f$. This is accomplished by providing the proper adjustment to the adjustment screws 25. The focal point $g$ of FIG. 3 can be varied by proper adjustment of the adjustment screws 25. Varying the relative moments M on either side of the plate will cause the focal point to shift position along a parallel to the $X$ coordinate axis.

Various other modifications and changes are contemplated and may be resorted to, without departing from the function or scope of the invention.

I claim as my invention:

1. An adjustable solar concentrator comprising a receiver tube, means supporting said receiver tube including spaced walls, a reflector plate, support members connected to opposite edges of the reflector plate, trunnions projecting from the ends of said support members and rotatively mounted in said walls for supporting said members and the reflector plate between said walls, and means imparting moments to said support members for flexing the reflector plate to produce a geometrically correct cylindrical parabolic solar energy reflecting surface capable of producing a sharp solar image on said receiver tube.

2. An adjustment solar concentrator as in claim 1, said reflector plate being supported between said end walls solely by said support members.

3. An adjustable solar concentrator as in claim 1, said support members having adjacent substantially parallel sides, and clamp members secured to said support members and having flanges between which and said adjacent sides said edge portions of the reflector plate are clamped.

4. An adjustable solar concentrator as in claim 1, said support members having adjacent substantially parallel sides, and clamp members secured to said support members and having flanges between which and said adjacent sides said edge portions of the reflector plate are disposed.

5. An adjustable solar concentrator as in claim 1, said support members having adjacent substantially parallel sides, and means securing said side edges of the reflector plate to said sides.

6. An adjustable solar concentrator as in claim 1, said means imparting moments to said support members comprising arms connected to the trunnions of the support members, flanges projecting from outer sides of said end walls, adjusting screws threaded through said flanges and bearing against said arms, remote from said trunnions, for imparting torque to the arms when said screws are advanced toward the arms.

7. An adjustable solar concentrator as in claim 1, said means supporting the receiver tube additionally including a transparent tube, forming a thermal shield, through which the receiver tube extends, said walls having openings in which the ends of the transparent tube are disposed, collars secured to the exterior of said walls in alignment with said openings, and screws threadedly engaging said collars and bearing against the receiver tube for supporting said receiver tube concentrically within the thermal shield.

* * * * *